United States Patent [19]
Shridhar et al.

[11] Patent Number: 5,727,194
[45] Date of Patent: Mar. 10, 1998

[54] REPEAT-BIT BASED, COMPACT SYSTEM AND METHOD FOR IMPLEMENTING ZERO-OVERHEAD LOOPS

[75] Inventors: Avadhani Shridhar, Sunnyvale, Calif.; Kenichi Nitta, Kodaira, Japan

[73] Assignee: Hitachi America, Ltd., Tarrytown, N.Y.

[21] Appl. No.: 478,438

[22] Filed: Jun. 7, 1995

[51] Int. Cl.⁶ ............................................. G06F 9/30
[52] U.S. Cl. ............................................. 395/588; 395/800
[58] Field of Search ............................ 395/800, 569, 395/588

[56] References Cited

U.S. PATENT DOCUMENTS

| | | | |
|---|---|---|---|
| 4,097,920 | 6/1978 | Ozga | 395/588 |
| 4,462,074 | 7/1984 | Linde | 395/588 |
| 4,463,422 | 7/1984 | Storer | 395/588 |
| 5,101,484 | 3/1992 | Kohn | 395/588 |
| 5,303,355 | 4/1994 | Gergen | 395/588 |
| 5,375,238 | 12/1994 | Ooi | 395/588 |
| 5,507,027 | 4/1996 | Kawamoto | 395/588 |

OTHER PUBLICATIONS

System Control, Architecture, pp. 346–350.

*Primary Examiner*—Tod R. Swann
*Assistant Examiner*—Christopher S. Chow
*Attorney, Agent, or Firm*—Douglas J. Crisman; Flehr Hohbach Test Albritton & Herbert LLP

[57] ABSTRACT

A repeat-bit based system and method for executing zero overhead loops, or repeat loops, in an information processing chip that does not require a repeat end register or a dedicated comparator. Executing repeat loops requires a processor to iterate N times a code fragment of loop instructions. All systems providing this capability must know when to refetch the first loop instruction at the end of a repeat. To do this, the present invention adds a repeat bit to the processor's instruction set. This bit is set by the assembler/compiler that generates the executable code fragment comprising the repeat loop. Where the repeat loop includes plural instructions, the assembler sets the repeat bit of the penultimate loop instruction. As each loop instruction is fetched, decoded and executed, the decoder detects the repeat bit and passes it to loop control circuitry. If the code fragment has not been iterated N times and the repeat bit is set, the program counter (PC) is loaded with the address of the first repeat loop instruction, which is refetched. Otherwise, the PC is incremented and the next instruction is fetched. Where the repeat loop has a single instruction, a nop instruction must be added after the instruction to be repeated. Two systems and methods for maintaining the repeat count are disclosed. The first requires a decrementor that decrements the repeat count from N each time the loop is iterated. Another replaces the decrementor with the PC incrementor, which increments the repeat counter from −N or −(N−1).

16 Claims, 4 Drawing Sheets

(PRIOR ART)
FIG.—2

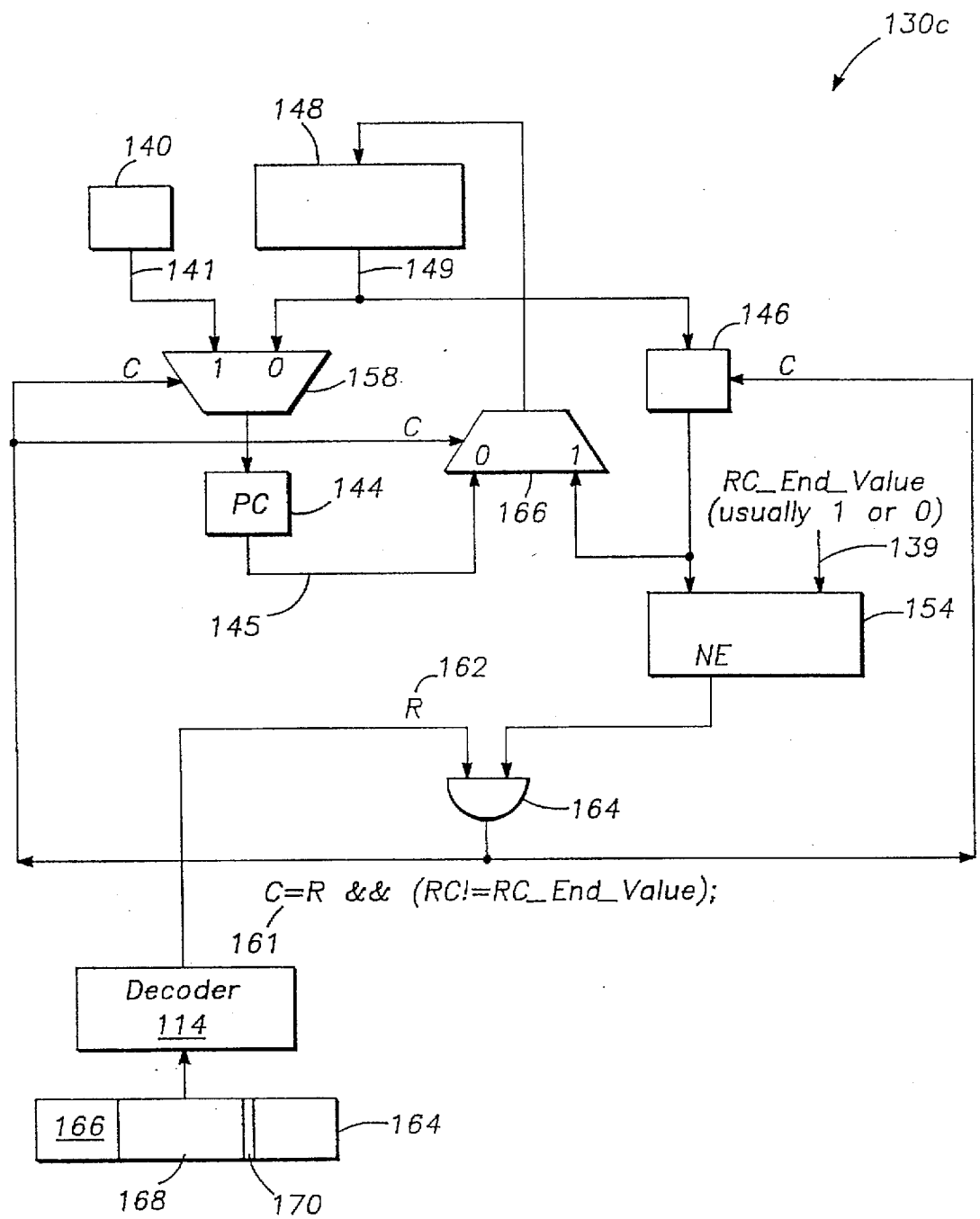
FIG.—4

REPEAT-BIT BASED, COMPACT SYSTEM AND METHOD FOR IMPLEMENTING ZERO-OVERHEAD LOOPS

INTRODUCTION

The present invention relates generally to digital signal processors, and particularly to implementation methods for executing zero-overhead loops in digital signal processors.

BACKGROUND OF THE INVENTION

Many digital signal processing (DSP) chips provide a zero-overhead looping, or repeat loop, capability that allows a sequence of instructions to be repeated a predetermined number of times without any delay occurring between the execution of the last and first instructions of subsequent repetitions of the sequence. Most DSP chips that provide such a capability have an instruction execution architecture consisting of pipelined fetch, decode and execute stages. In such a pipelined architecture, one instruction can be fetched from a program memory while a second instruction is decoded and a third instruction is executed. Thus, by providing repeat loop circuitry that causes the first instruction of a sequence to be fetched while the last instruction of the same sequence is being decoded, a DSP can in consecutive cycles execute the last and first instructions of the repeat loop.

FIG. 1 is a block diagram of a typical digital signal processing chip (DSP) 110 shown in the context of computer system 100 that also includes a primary memory 118 (on-chip and/or off-chip memory) connected to the DSP 110 via a memory bus 121. The computer system 100 could also include an optional microprocessor 106, input/output devices such as a keyboard 122 and display 124 connected to the microprocessor 106 by an input/output bus 123, and a slow secondary memory 120 (such as a hard disk) connected to the memory bus 121. The DSP 110 employs a common, pipelined architecture consisting of linked fetch, decode and execute stages 112, 114, 116, each of which is coupled to DSP registers (not shown) and the primary memory 118.

Source code 126 and executable 128 versions of DSP programs are stored in the secondary memory 120. These programs can include executable application programs 128a, programming tools such as a source code assembler 128b and compiler 128c, and data processing (DP) programs 128d. By using the assembler 128b, a user can create executable DP programs 128b from source programs 126d. When the DSP 110 is used in an embedded system, i.e., a system where the optional microprocessor 106, keyboard 122 and display 124 are not present, the executable programs 128d are burned into the primary memory 118, which, in this instance, includes read only memory (ROM) or electronically programmable ROM (EPROM) in addition to RAM. When the DSP 110 is used as a coprocessor (e.g., as a multimedia accelerator in a personal computer), the microprocessor 106 downloads the executable programs 128d to the primary memory 118, which is a RAM. In either case, stored executable DSP programs 128d' are stored in the primary memory 118 so that the machine readable instructions; e.g., instr_1 through instr_K of stored program 128d-1', occupy contiguous memory locations. The DSP 110 then executes this program on data 119 in the primary memory 118 by fetching, decoding and executing each of the instructions in order, unless the machine readable instructions dictate otherwise. As is well known, this type of pipelined architecture allows rapid program execution as one instruction (e.g., instr_3) can be fetched from the primary memory 118 while a second instruction (instr_2) is decoded and a third instruction (instr_1) is executed. Thus, no cycles are wasted between the execution of two consecutive instructions.

In the DSP 110, a repeat loop capability is provided by the repeat circuitry 130, which, by sharing key information with the fetch, decode and execute stages 112, 114, 116, causes the DSP 110 to re-fetch the first instruction (e.g., instr_1) of a sequence while the last instruction (e.g, instr_k) of the same sequence is being decoded. This places the first and last instructions in adjacent positions in the execution pipeline so that, as soon as the last instruction has been executed, the first instruction of the subsequent iteration is executed without delay. A typical prior art implementation 130a of the repeat loop circuitry 130 is discussed below in reference to FIG. 2.

The particular configuration of the zero-overhead loop circuitry 130 depends on which of the three types of repeat loops are supported by the DSP 110. Maximum-restricted repeat loops (or type one loops) restrict the maximum number of instructions in the loop to a small number, typically one or two. In a minimum-restricted repeat loop (or type two loop), there are a minimum of two or three instructions. Finally, there are unrestricted repeat loops (or type three loops), which do not restrict the minimum or maximum number of instructions in the loop, or restrict the maximum number of instructions to a large value, typically 512 or more.

In a maximum-restricted loop, the instructions of the repeat loop are usually fetched just once and then saved in internal DSP registers. The maximum number restriction is based on the number of such registers available. After a first iteration of the loop, subsequent iterations of the loop execute out of these internal registers. In contrast to type one loops, loop types two and three require considerable hardware for implementation, usually including registers to store repeat start and repeat end addresses, a comparator to compare the repeat end address with the contents of the program counter register, a decrementor to decrement the contents of a repeat counter register, and control circuitry. FIG. 2 shows an expanded block diagram of typical DSP repeat circuitry 130a used to implement type two or three repeat loops, which are the focus of the present invention.

The repeat loop circuitry 130a in FIG. 2 includes a repeat start register (RS) 140, repeat end (RE) register 142, program counter (PC) register 144, and repeat counter (RC) register 146. The PC register 144 receives a selected address 159 from a multiplexer (MUX) 158 and outputs a PC address 145 to an incrementor 148, a first comparator 152, and the fetch stage 112. The MUX 158 receives two selectable inputs, a repeat start address 141 from the RS register 140 (at MUX input "1") and an incremented PC address 149 (at MUX input "0") from the incrementor 148. The MUX 158 selects and outputs one of these inputs as the selected address 159 in response to a control signal 160 (input to the MUX select pin) generated by a loop control gate 156.

The first comparator 152 receives, in addition to the PC address 145, an RE address 143 from the RE register 142 and, from those signals, generates a repeat end signal 153. The repeat end signal 153, and a not_loop_end signal 155 generated by a second comparator 154, are input to the control gate 156, which in turn outputs the control signal 160 to the MUX 158 and to the load input of the RC register 146. The not_loop_end signal 155 from the second comparator 154 is based on two inputs received by the second comparator 154, a repeat count 147 from the repeat counter (RC) 146 and a repeat count end value (RC_End_Value) 139. The repeat count 147 is also input by a RC decrementor 150, which outputs a decremented repeat count 151 to the RC register 146.

The RS and RE registers 140, 142 hold, respectively, the address of the first and last instructions in the loop, and the RC register 146 holds a number that indicates the loop iterations remaining to be completed. Typically, these registers are special or system registers, meaning they cannot be used for calculations as if they were regular registers. For the purposes of describing the prior art in FIG. 2 and the preferred embodiments of the present invention, the PC 144 is understood to hold the address of the instruction which is to be fetched in the next fetch cycle.

For the first cycle of the first iteration of the repeat loop, the PC 144 is loaded with the address of the first instruction of the repeat loop, causing the DSP 110 to fetch that instruction. During the same cycle, the incrementor 148 increments the current PC address 145 and outputs the incremented PC address 145 to the MUX 158. At this point, the control circuitry 156 has not yet set the control signal 160, so the MUX 158 selects and outputs the incremented PC address 149 to the PC. Consequently, during the next fetch cycle, the DSP 110 will fetch the second instruction of the repeat loop. This process is repeated until the first comparator 152 indicates by setting the repeat end signal 153 that the PC address 145 equals the RE address 143, which means that the last instruction in the repeat loop has just been fetched. When this is the case, assuming that the loop has not been repeated the requisite number of times, the control gate 156 asserts the control signal 160, causing the MUX 158 to output the first instruction's address 141 from the RS register 140 to the PC 144.

As mentioned above, the control circuitry 156 sets the control signal 160 when the RE address 143 equal the PC address 145 and the repeat loop has not yet been repeated the requisite number of times. This latter condition (i.e. non-completion of the loop) is signaled by the second comparator 154 asserting the not_loop_end signal 155. The second comparator 154 continually compares the repeat count 147 output by the RC register 146 to the RC_End_Value 139. As long as the two values are not equal, the second comparator 154 asserts the not_loop_end signal, which allows the control circuitry 156 to set the control signal 160 to initiate the next iteration of the repeat loop. The control signal 160 signal is also fed back to the load input of the RC register 146. Consequently, when the control gate 156 asserts the control signal 160, the RC register 146 loads the decremented repeat count 151 (i.e., repeat count−1) maintained by the decrementor 150. Typically, the RC register 146 is initially set to N, the number of required iterations or N−1, so the corresponding RC_End_Value must be set, respectively, to 1 or 0. This is necessary so the second comparator 154 will deassert the not_loop_end signal 155 only when the very last iteration of the repeat loop has been completed. When this loop end condition occurs, the PC register 144 is again loaded with the incremented PC address 149, thereby causing the DSP 110 to fetch the next instruction after the repeat loop instructions.

The preceding description of the interrelationship of the control signal (C) 160, the end_repeat signal 153 and the not_loop_end signal 155 can be summarized in the following C-language boolean expression:

C=(RE==PC) && (RC!=RC_End_Value).

That is, the control signal 160 will only be asserted when the repeat end address 153 equals the PC address 145 (i.e., the last loop instruction has just been fetched) and the loop has not been repeated N times. When the control signal 160 is asserted, the PC register 144 is loaded with the repeat start address 141, thereby causing the DSP 110 to branch back to the start of the repeat loop. When the control signal 160 is not asserted, the incremented PC address 149 (i.e., PC+1) generated by the incrementor 148 is loaded into the PC register 144. Thus, whenever the repeat count 147 equals the RC_End_Value 139, even if the PC address is the same as the repeat end address, the PC register 144 contents will be incremented past the repeat end address 143, thereby causing the DSP 110 to exit the repeat loop.

The prior art circuitry in FIG. 2 requires considerable hardware, such as the multiple registers 140, 142, 144, 146, the two comparators 152, 154, and the separate incrementor 148 and decrementor 150. The more hardware that is integrated on a chip, the larger and therefore more expensive the chip becomes. Thus, there is a need for compact, zero-overhead loop circuitry that will enable the development of smaller, less costly DSPs and will allow repeat loop capabilities to be added to general purpose microprocessors. More specifically, there is a need for a new method of implementing zero-overhead loops that requires fewer special registers and comparators than the prior art circuitry. There is a further need for a new method of implementing zero-overhead loops that does not require a decrementor for decrementing the RC.

SUMMARY OF THE INVENTION

In summary, the present invention is a repeat-bit based system and method for executing zero-overhead loops that meets the needs set out above.

More specifically, the present invention is a method of executing a zero overhead loop in an information processing chip having a pipelined architecture and an instruction set with a plurality of instructions that are modifiable to indicate that the instructions are repeat end instructions. For the purposes of the present invention, executing a zero overhead loop, also known as a repeat loop, involves iterating N times a code fragment of at least two loop instructions, a predetermined one of the loop instructions having been encoded to indicate that it is a repeat end instruction. This method includes the following steps:

(1) fetching, decoding and executing each of the loop instructions in a predetermined order;

(2) when decoding one of the predetermined loop instructions, detecting that the predetermined loop instruction is the repeat end instruction;

(3) determining whether the loop has been iterated N−1 times;

(4) as long as the loop has not been iterated N−1 times, upon detecting that said predetermined loop instruction is the repeat end instruction, fetching a first loop instruction so that the first loop instruction is executed after a last of the loop instructions is executed but not later than any other of the loop instructions is executed, the last loop instruction occurring later in the code fragment than the predetermined instruction; and (5) terminating the loop when the code fragment has been iterated N times.

The present invention is also a method for executing a single instruction repeat loop. This method is similar to the method for executing loops with plural instructions; however, it requires that the single instruction and a nop instruction be combined into a single executable code fragment and the repeat end field of both the single and the nop instructions be set to a first end field value to indicate that the single and the nop instructions are repeat end instructions. This method includes the following steps:

(1) fetching, decoding and executing the instructions in the executable code fragment in a predetermined order by updating the address stored in the PC register, the single instruction being fetched before the nop instruction;

(2) when decoding the single instruction and the nop instruction, detecting that the repeat end field is set to the first end field value;

(3) determining whether the first end field value was detected N-1 times;

(4) as long as the first end field value has not been iterated N-1 times, upon detecting the first end field value, loading the PC register with contents of the RS register so that, so that, after the single instruction and the hop instruction have each been executed once, the single instruction is executed an additional N-1 times without any intervening delays or nops; and (5) terminating the loop when the single instruction has been executed N times.

The present inventions is also a system for implementing zero overhead loops in an information processing chip having an instruction set with a plurality of instructions, each having a repeat field that is set to a value selected from the group consisting of a repeat value or a non-repeat value; program count (PC), repeat start (RS) and repeat count (RC) registers; a multiplexer (MUX); and fetch, decode and execute cycles. This system includes the following components:

A decoder that, when decoding the instructions during the decode cycle, sets and outputs a repeat flag only when decoding a repeat instruction, which is an instruction that has its repeat field set to the repeat value; and A control circuit coupled to the output of the decoder that sets a control signal to a first control value when the repeat flag is set and the repeat count maintained by the RC register does not equal a repeat count end value, the not equal condition indicating that the sequence must be repeated at least one more time. Otherwise, the control circuit sets the control signal to a second control value. The control circuit outputs the control signal to the MUX select input and the RC register load input. When the control signal is set to the first control value, the following events occur: (1) the MUX is caused to output an address of a first of the loop instructions to the PC register, resulting in the code fragment being repeated from the first instruction, and (2) the RC register is caused to load a modified repeat count, the modified repeat count being selected from a decremented or an incremented version of the repeat count. When the control signal is set to the second control value, the MUX outputs the address of a next of the instructions from the incrementor to the PC register, resulting in the instructions being sequentially executed.

The present invention also is a method for converting a source code repeat loop into a code fragment that can be efficiently run on a computer having a repeat start (RS) register and a repeat count (RC) register. Here, the source code repeat loop has an initial repeat statement and at least two loop statements, the repeat statement indicates that the loop statements should be executed N times, the loop statements including a first statement and a repeat end statement determined by its position within the loop statements, the code fragment has first and repeat end instructions, the RC register holds a repeat count indicating the number of times the code fragment needs to be executed and the RS register stores the runtime address of the first instruction. This method includes the following steps:

(1) converting the initial repeat statement to an executable repeat instruction that, when executed, causes the computer to set the repeat counter (RC) to N and load the repeat start (RS) register with the runtime address of the first instruction;

(2) converting the loop statements to corresponding loop instructions from the computer's instruction set, the loop instructions making up the code fragment; e.g., the first loop instruction corresponding to the first loop statement;

(3) when converting the repeat end statement, setting the repeat field of the resulting repeat loop instruction to a first end field value, the first end field value triggering the computer executing the instruction to repeat the code fragment from the first loop instruction; and (4) when converting statements other than the repeat end statement, setting the repeat end field of the resulting loop instructions to an end field value different from the first end field value.

BRIEF DESCRIPTION OF THE DRAWINGS

Additional objects and features of the invention will be more readily apparent from the following detailed description and appended claims when taken in conjunction with the drawings, in which:

FIG. 4 is a block diagram of another preferred embodiment of the repeat loop circuitry of the present invention.

DESCRIPTION OF THE PREFERRED EMBODIMENT

Figure 1:
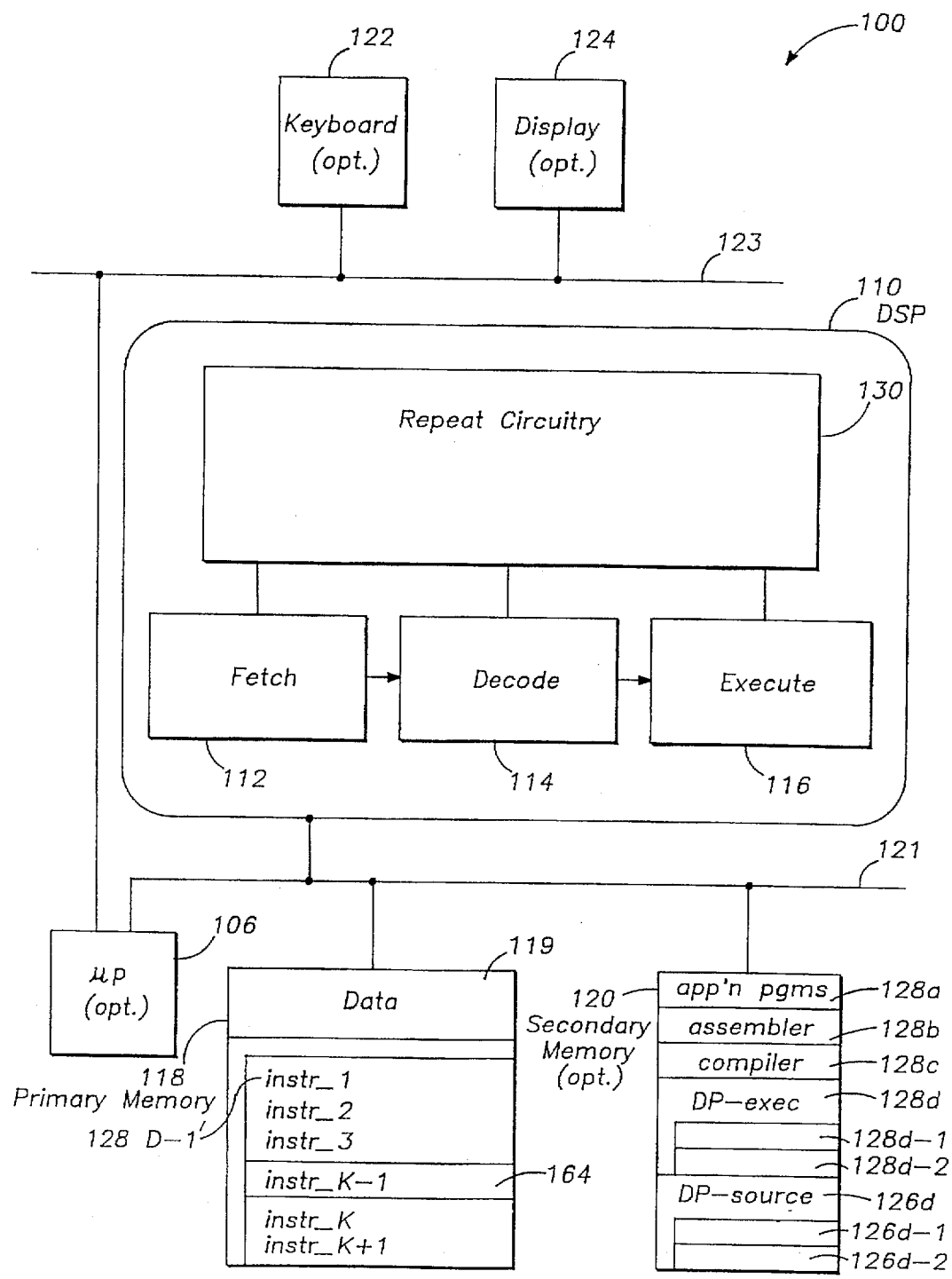
FIG. 1 is a block diagram of a computer system including a DSP.
Figure 2:
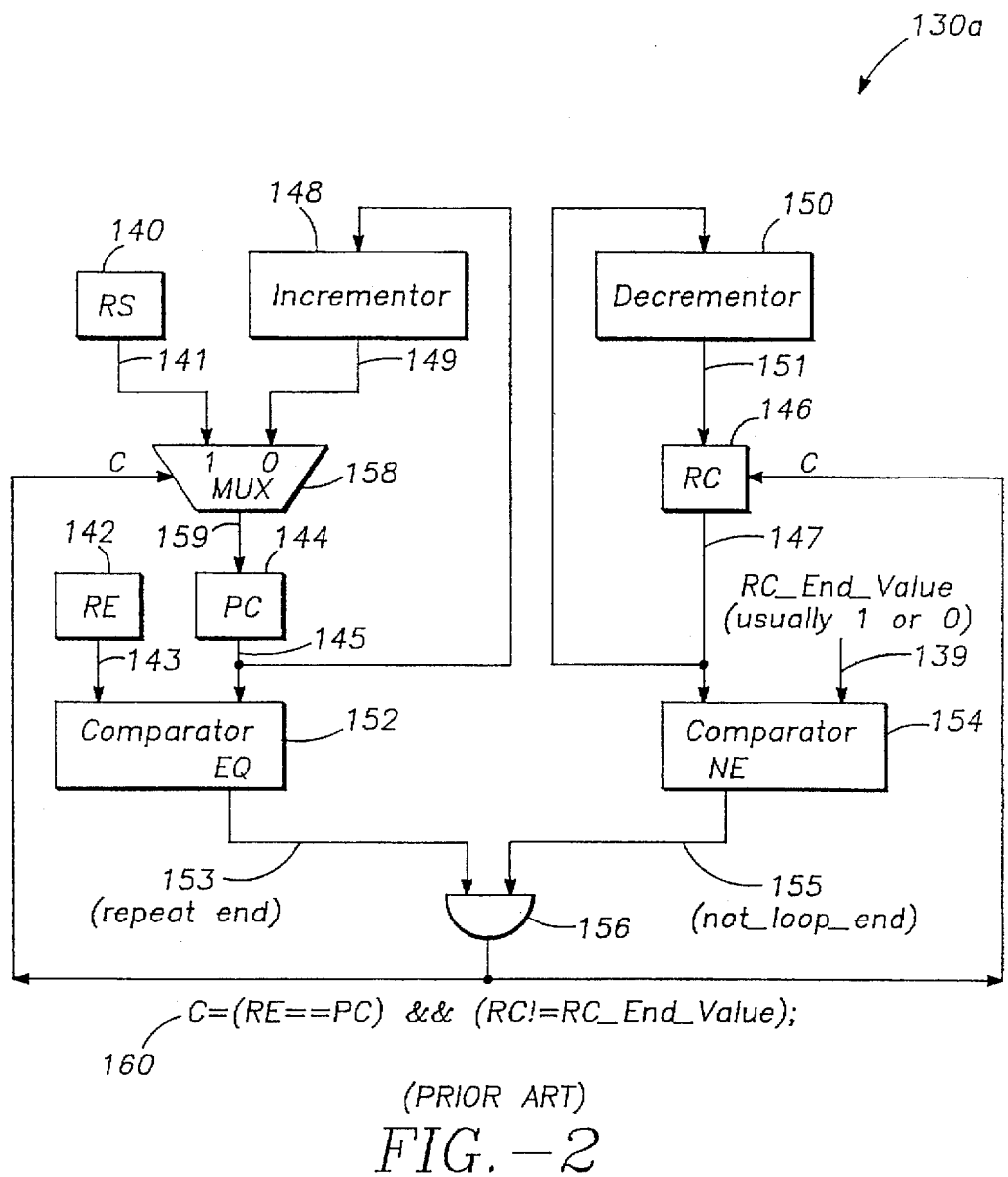
FIG. 2 is a block diagram of prior art repeat loop circuitry.
Figure 3:
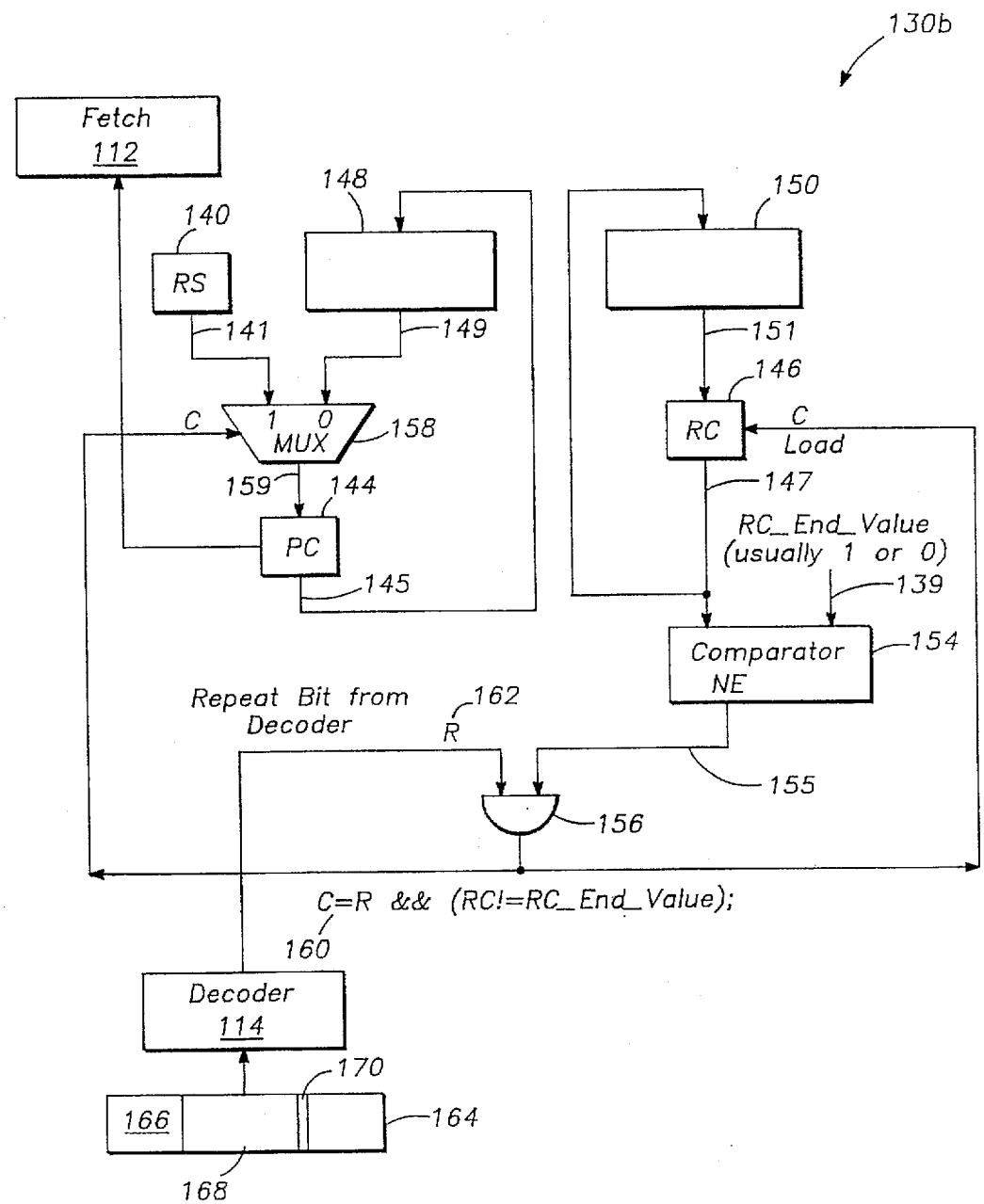
FIG. 3 is a block diagram of a preferred embodiment of the repeat loop circuitry of the present invention.

Referring to FIG. 3, there is shown a block diagram of a preferred embodiment of the DSP zero-overhead loop circuitry $130b$ of the present invention. The repeat loop circuitry $130b$ performs the same function as the repeat loop circuitry $130a$ of FIG. 2 and exists in the same context as the circuitry 130 shown in FIG. 1. That is, the repeat loop circuitry $130b$ of the present invention is a circuit block within the DSP 110 coupled to the DSP's fetch, decode and execute stages 112, 114, and 116.

As is readily apparent from a comparison of FIGS. 2 (prior art) and 3, the repeat loop circuitry $130b$ is similar to but more compact than the prior art circuitry $130a$. This is because the circuitry $130b$ eliminates the prior art's RE register 142 and first comparator 152. This downsizing results in a substantially smaller therefore less expensive chip. Eliminating the RE register also means one less instruction (the instruction that is needed to set the special register RE) and one less register to save/restore in a context switch. Serving the same purpose as the eliminated components is a repeat bit 162 supplied by the decoder 114, which, when set, indicates to the control gate 156 that the last instruction of the repeat loop has been fetched. The control gate's other input, the not_loop_end signal 155 from the comparator 154 is unchanged from FIG. 2. Thus, when the repeat bit 162 and the not_loop_end signal 155 from the comparator 154 are set, the control gate 156 sets the control signal (C) 161. That is, the control signal C 161 is defined by the following C-language, boolean expression: C=R && (RC!=RC_End_Value).

The present invention makes this simplifying change possible by adding a dedicated repeat bit 170 in the DSP 110's instruction set, as is shown in FIG. 3. As in any digital processor, each instruction in the DSP 110's instruction set, for example, instr_K−1 164, includes an opcode field 166 and an operand field 168, the latter of which comprises arguments and control information relevant to the type and context of the corresponding instruction. In a preferred embodiment of the present invention, the repeat bit 170 is allocated from the operand field 168 of each instruction in the DSP's instruction set. This allows any DSP instruction to be a repeat end instruction. Generally, the repeat bit 170 will be asserted in only one instruction (the repeat end instruction) of a repeat loop, typically the penultimate instruction. However, depending on the number of stages in the DSP's execution pipeline, the repeat instruction could be other than the penultimate instruction.

As the decoder 114 decodes each instruction in the repeat loop, it detects the repeat bit 170 and passes it as the repeat bit signal 162 to the control gate 156. When the repeat bit 162 is not set, the control signal 161 is inactive and the MUX 158 loads the PC register with the incremented PC 149, meaning that the DSP 110 fetches, decodes and executes the program instructions in order. If the repeat bit is set, the control gate 156 sets the control signal 161 as long as the second comparator 154 has also set the not_loop_end signal 155. Setting the control signal 161 causes the MUX 158 to load the PC with the first instruction address from the RS register 140, meaning that the first loop instruction will be fetched in the next fetch cycle as the last instruction in the loop is being decoded and the penultimate (or repeat) instruction is being executed. In this way, the present invention provides a seamless, zero-overhead loop implementation that does not require a repeat end register 142 or a first comparator 152.

For example, assume that a user wishes to execute the following source code fragment, corresponding to program 126d-1, in the DSP 110:

```
repeat end_label N        /* repeat the instructions before
                             end_label, N times */
delay_slot_instr
start label:
    instr_1
    instr_2
    instr_3
    ...
    Instr_K − 1
    instr_K
end_label;                /* indicates end of the repeat loop */
instr_K + 1
```

Before this code fragment can be executed, a source code assembler 128b (or compiler 128c) that has been upgraded to be compatible with the zero-overhead looping method of the present invention must first assemble the code fragment into a sequence of executable instructions 128d-1, which are then loaded into the primary memory 118 as the program 128d-1'. Each of these executable instructions comprises a single opcode from the DSP 110 instruction set and, possibly, one or more operands, and has an associated address representing its location (either real or virtual) in the primary memory 118 while the code fragment is being executed. For the purposes of the following discussion, an instruction's runtime address is designated as "@" plus the instruction identifier; e.g., instr_1 has a runtime address of @instr_1. Generally, all of the instructions are held in contiguous memory locations so they can be sequentially fetched by simply incrementing the PC address 145 supplied to the fetch stage 112.

In this code fragment 126d-1, The "repeat end label N" source instruction indicates to the assembler 128b that the K instructions (i.e., "instr_1" through "instr_K") between the "start label" and the "end_label" are to be executed N times. This "repeat" instruction is assembled to an opcode that, when executed, causes the DSP 110 to (1) load the RC register with the number N (the number of loop iterations), and (2) load the RS register with the current contents of the PC 144 before the PC is incremented (this happens to be @instr_1, the address of the first loop instruction). The delay_slot instruction is a filler instruction, the purpose of which is to delay the fetching of instr_1 at runtime until the repeat instruction is being executed, meaning that when the "repeat" instruction is executed, the PC value with which the RS register is loaded is the address of "start_label," i.e., @instr_1. When assembling the loop instructions instr_1 through instr_K, the assembler sets the repeat bits for all but the penultimate instruction in the loop (i.e., instr_K−1) to 0; which the assembler sets to 1 (the repeat value). Thus, the executable version 128d-1' of the code fragment will appear in the primary memory as follows:

| runtime addr. | Instruction | repeat bit |
| --- | --- | --- |
| @rep | repeat | 0 |
| @del | delay_slot_instr | 0 |
| @instr_1 | instr_1 | 0 |
| @instr_2 | instr_2 | 0 |
| @instr_3 | instr_3 | 0 |
| ... | | |
| @instr_K − 1 | Instr_K − 1 | 1 |
| @instr_K | instr_K | 0 |

Referring to Table 1 below, there is shown the status of the PC and RS registers, the repeat bit and the control signal C after the DSP has completed the current decode cycle and the status of the RC register before the current decode cycle. Table 1 also shows which instructions the DSP 110 is fetching, decoding and executing for each cycle while the DSP 110 executes the program 128d-1.

TABLE 1

| cycle | F | D | X | PC | RC | RS | repeat | C |
| --- | --- | --- | --- | --- | --- | --- | --- | --- |
| 1 | instr_1 | delay | repeat | @instr_2 | N | @instr_1 | 0 | 0 |
| 2 | instr_2 | instr_1 | delay | @instr_3 | N | @instr_1 | 0 | — |
| 3 | instr_3 | instr_2 | instr_1 | @instr_4 | N | @instr_1 | 0 | — |

TABLE 1-continued

| cycle | F | D | X | PC | RC | RS | repeat | C |
|---|---|---|---|---|---|---|---|---|
| K − 1 | K − 1 | K − 2 | K − 3 | @K | N | @instr_1 | | |
| K | K | K − 1 | K − 2 | @1 | N | @instr_1 | 1 | 1 |
| K + 1 | 1<br>K − 1 | K | K − 1 | @2<br>@K | N − 1 | @instr_1 | | |
| N * K | K | K − 1 | K − 2 | @K + 1 | 1 | | 1 | 0 |
| N * K + 1 | K + 1 | K | K − 1 | | | | | |
| N * K + 2 | | K + 1 | K | | | | | |
| N * K + 3 | | | K + 1 | | | | | |

The first record in Table 1 corresponds to loop cycle 1, after the DSP 110 has already executed the "repeat" instruction and fetched "instr_1". Thus, for cycle 1, the RS and RC registers are loaded respectively with the address of instr_1 (@instr_1) and the number of loop iterations (e.g., N), and the PC has been incremented to @instr_2, the address of the next instruction to be fetched. The DSP 110 then begins fetching, decoding and executing the instructions in order, so that after three cycles the pipeline is filled, with instr_1 being executed, instr_2 being decoded, and instr_3 being fetched simultaneously.

During cycle K, the decoder decodes instr_K−1 and passes the set repeat bit 162 to the control circuitry 130b of the present invention. Based on this set repeat bit and the fact that the repeat count (i.e., N) 147 is not equal to the RC_End_Value (i.e., 1) 159, the control gate 156 sets the control signal 161. This causes the MUX to load the PC register with @instr_1 and the RC register 146 to be loaded with the decremented RC value (N−1) from the decrementor 150. Thus, during cycle K+1, the DSP 110 begins the second iteration of the code fragment 128-d1' by fetching instr_1 while decoding instr_K and executing instr_K−1 from the first iteration.

A similar situation arises on cycle N*K where, once again, the decoder 116 decodes instr_K−1 and passes the set repeat bit to the control gate 156. However, at this point, the RC value is 1, equaling the loop end value (1), so the control circuitry does not set the control signal. As a result, at the end of cycle N*K, the MUX once again loads the PC with the incremented PC value (@instr_K+1), exiting the repeat loop.

The foregoing description of the present invention assumes that the code fragment being repeated has at least two instructions. This is because, in the DSP's pipelined architecture, when an instr_K−1 is decoded, as in cycle K, instr_K will already have been fetched. Thus, the repeat bit must be set in the penultimate instruction in the loop, so the first instruction can be fetched immediately after instr_K is fetched. However, the present invention provides another repeat instruction, "repeat1", that allows the repeat circuitry to implement single instruction loops.

Single Instruction Repeat Loops

Where the user wishes to repeat a single instruction; e.g., "instr_a", the implementation method of the present invention requires that (1) the "repeat1" instruction rather than the "repeat" instruction be used, and (2) the user must insert a no operation instruction ("nop") after instr_a. With these two changes a single instruction loop can be executed according to the description provided above for repeated code fragments with two or more instructions.

For example, the following code fragment 126d-2 allows instr_a to be repeated N times:

```
repeat1          N          /* repeat one instruction N times */
delay_slot_instr
start_label:
    instr_a
    nop
instr_b
```

The assembler assembles the "repeat1" mnemonic to the same opcode as for the "repeat" instruction; thus, when the "repeat1" instruction is executed, it results in the initialization of the RC and the RS registers. However, when the assembler sees the "repeat1" mnemonic, it sets the repeat bit for both the "instr_a" and "nop" instructions. This is the key code modification that allows the DSP repeat loop circuitry 130b to process single instruction loops. The single-loop repeat method of the present invention is illustrated in Table 2 below, which shows the status of the registers and the fetch, decode and execute stages as the DSP 100 executes the aforementioned single instruction repeat loop. Please note that Table 2 shows the pre-decode status of the RC register and the post-decode status of the PC register and the repeat and control signals.

TABLE 2

| cycle | F | D | X | PC | RC | RS | repeat | C |
|---|---|---|---|---|---|---|---|---|
| 1 | instr_a | delay | repeat | @nop | N | @instr_a | 0 | 0 |
| 2 | nop | instr_a | delay | @instr_a | N | @instr_a | 1 | 1 |
| 3 | instr_a | nop | instr_a | @instr_a | N − 1 | @instr_a | 1 | 1 |
| 4 | instr_a | instr_a | nop | @instr_a | N − 2 | @instr_a | 1 | 1 |
| 5 | instr_a | instr_a | instr_a | @instr_a | N − 3 | @instr_a | 1 | 1 |
| 6 | | | instr_a | | N − 4 | @instr_a | 1 | 1 |
| N | | | | @instr_a | 2 | @instr_a | 1 | 1 |
| N + 1 | instr_a | instr_a | instr_a | @nop | 1 | @instr_a | 1 | 0 |
| N + 2 | nop | instr_a | instr_a | @instr_b | 1 | @instr_a | 1 | 0 |
| N + 3 | instr_b | nop | instr_a | | 1 | | 1 | 0 |

TABLE 2-continued

| cycle | F | D | X | PC | RC | RS | repeat | C |
|---|---|---|---|---|---|---|---|---|
|  |  | instr_b | nop |  |  |  | 0 | 0 |
|  |  |  | instr_b |  |  |  | 0 | 0 |

Cycle 1 of the single instruction method proceeds exactly as described in reference to Table 1. In cycle 2, the DSP fetches the nop instruction, and decodes instr_a. Because instr_a is a repeat instruction (i.e., it has a set repeat bit), and because at the beginning of the decode stage the repeat count (RC) is greater than 1, the control circuitry sets the control bit, which causes the repeat count to be decremented and the PC to be loaded with the address of instr_a (@instr_a). In cycle 3, the DSP decodes the nop instruction and executes instr_a. Because the repeat bit 170 of the nop instruction is set, decoding this instruction causes the same effects as when instr_a is decoded. Thus, during cycle 3, the PC address 145 is once again set to @instr_a and the repeat count 147 is decremented. The same process repeats again for cycle 4, except the DSP 110 executes the nop instruction. From cycle 5 through cycle N+3, the DSP 110 will execute instr_a an additional N−1 times, at which time the repeat loop is completed. The process by which the present invention completes the repeat loop and continues processing is illustrated at the bottom of Table 2, from cycle N on.

After decoding instr_a in cycle N, the decoder passes the set repeat bit to the control circuitry which, because the pre-decode repeat count equals 2, once again sets the control signal, causing the PC to be loaded with @instr_a and the repeat count to be decremented to 1. During cycle N+1 and subsequent cycles, when the repeat count equals 1, the control circuitry does not set the control signal. Consequently, during cycle N+1, the PC is incremented past @instr_a to address the nop instruction, which is fetched in cycle N+2. This step completes the repeated fetching of instr_a; however, instr_a will be executed twice more, in cycles N+2 and N+3, to provide the requisite N iterations of instr_a.

Thus, by providing the two repeat mnemonics ("repeat" and "repeat1"), the repeat circuitry 130b of the present invention is able to implement repeat loops of all sizes in a compact design that eliminates a comparator, the repeat end register and the need for constantly comparing the current PC address 145 to the repeat end address 143. Moreover, the repeat loop circuitry 130b wastes only one cycle in starting a loop (if the delay_slot_instr is filled), whereas prior art circuitry for implementing unrestricted repeats, such as the circuit 130a, requires three overhead cycles. Also providing the same advantages over the prior art is a second preferred embodiment of the present invention, which is even more compact than the first.

Alternative Preferred Embodiments

A block diagram of a second preferred embodiment of the repeat circuitry 130c is shown in FIG. 4. The key idea behind this embodiment is to use the incrementor 148 to maintain the repeat count in the RC register 146, eliminating the need for the decrementor 150 used in the other repeat circuits 130a and 130b. To allow the incrementor 148 to serve double duty (i.e., maintaining both the PC and the RC), a second MUX 166 is provided. This second MUX 166 has two inputs, one from the PC 144 and one from the RC register 146, which are selectable depending on the state of the control signal 161 coupled to the second MUX's select input. That is, the second MUX 166 outputs the PC value or the repeat count to the incrementor 148 when the control signal 161 is "0" or "1", respectively. Thus, the multiplexed incrementor 148 increments the PC value whenever the control signal 161 is "0" and the repeat count whenever the control signal 161 is set to "1". The incrementor 148 then outputs the incremented signal (either the incremented PC or RC) to the RC register 146 and the "0" input of the MUX 158. The fact that the circuitry 130c uses the incrementor 140 to maintain the repeat count RC dictates that the RC register 146 be initially set to −N or −(N−1) rather than N or N−1, and the RC_End_Value be appropriately set to −1 or 0. This allows the same simple comparator 154 from the prior art 130a and the first preferred embodiment to be used to check the end of loop condition.

Thus, when the control gate 156 has not set the control signal (i.e., when the control signal is "0"), the second MUX 166, the incrementor 148 and the first MUX 158 form a loop that results in the PC register 144 being loaded with incremented PC values at the conclusion of each fetch cycle. When the control gate 156 sets the control signal, signaling an imminent repeat, the following three transitional events occur:

(1) the PC register 144 is loaded with the repeat start address from the RS register 140 (this has been described above);

(2) the repeat count is selected by the MUX 166 and passed to the incrementor 148, which outputs an incremented repeat count to the RC register during the same decode cycle; and (3) the RC register 146 is loaded with the incremented repeat count.

As in the other inventive embodiment, circuit 130b, when the current repeat count is equal to the RC_End_Value 159, the comparator 154 outputs a low signal to the control gate 156, which as a result, does not generate the set control signal. Because the second preferred embodiment relies on the same basic components as the prior art circuitry 130a and the first preferred embodiment 130b, it can be used with either type of circuitry. The RC_End_Value 159 is usually set to −1 or 0. If the RS register 140 can be initialized to −(N−1), then RC_End_Value is 0, and the comparator 154 can be simplified to be just an inverter connected to the most significant bit (i.e., the sign bit) of the RC input 147. This is because the RC value is initially negative, and becomes positive (sign bit =0), when it equals the RC_End_Value of 0.

The preceding description assumes that the PC is incremented by 1 between instruction fetches. However, some processors that support byte-addressing increment the PC by some constant K, which is generally a power of two. For example, a byte-addressing processor with 16-bit instructions may increment PC address 145 by 2. To accommodate such processors, the PC incrementor 148 can be modified to increment the PC by K. In such cases, the RC register 146 is initialized to −N*K, the RC_End_Value 159 is set to −K, and each time the control signal 161 is set, the incrementor 148 will increment the repeat count by K. Of course, there is no reason why the present invention cannot work when the RC register 146 is initialized to different values as long as the RC_End_Value 159 is set appropriately.

The described preferred embodiments assume that a repeat bit or repeat field can be allocated in every instruction of a processor's instruction set. This a valid assumption regarding future DSP's, which are likely to provide full 32-bit instruction sets or at least a mix of 16-bit and 32-bit instructions, or general purpose microprocessors, which already use 32-bit instructions and are moving to 64-bit instructions. This assumption also applies to other future processor architectures, such as VLIW (Very Long Instruction Word), which will provide long instruction words. However, there is an intermediate implementation for the situation when it is not possible to dedicate a repeat bit in each instruction of a processors instruction set.

In such a situation, a subset of the instruction set will be designated as repeat end instructions in which a repeat bit can be designated and set. These selected instructions are thus the only instructions that can be a "repeat end" instruction in a repeat loop. The subset of instructions should include the instructions that are frequently used in small loops. For example, in DSP's, the subset of repeat end instructions should include the frequently used instructions that specify parallel operations. In addition, to allow the implementation of single instruction repeat loops, a nop instruction with a dedicated repeat bit must always be provided. Where such a mixed instruction set is required, the decoder will first have to determine whether the instruction being decoded is within the set of repeat instructions before checking the repeat bit.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, while the preceding descriptions have largely been directed to DSP's, the improvements of the present invention are equally appropriate for use in general purpose microprocessors providing repeat loop capabilities.

What is claimed is:

1. A method of executing a zero overhead loop in an information processing chip having a pipelined architecture and an instruction set with a plurality of instructions that are modifiable to indicate that said instructions are repeat end instructions, wherein said loop involves iterating N times one or more loop instructions from a code fragment, said method comprising:

when said code fragment includes only a single loop instruction followed by a NOP instruction, modifying said single loop instruction and said NOP instruction to indicate that said instructions are said repeat end instructions;

when said code fragment includes only a plurality of loop instructions, modifying only a predetermined loop instruction in said code fragment to indicate that said predetermined loop instruction is said repeat end instruction;

fetching, decoding and executing each of said loop instructions in a predetermined order;

detecting whether said loop instruction being decoded is said repeat end instruction;

determining whether said loop has been iterated N-1 times;

as long as said loop has not been iterated N-1 times, upon detecting that said decoded loop instruction is said repeat end instruction, fetching a first loop instruction so that said first loop instruction is executed after a last of said loop instructions is executed but not later than any other of said loop instructions is executed, such that:

when said code fragment includes only said plurality of loop instructions, said last loop instruction occurs later in said code fragment than said predetermined instruction; and when said code fragment includes only said single loop and NOP instructions, for every loop iteration following a first iteration said first loop and last loop instructions are identical to said single loop instruction, said NOP instruction only being executed during said first iteration; and terminating said loop when said code fragment has been iterated N times.

2. The method of claim 1, wherein:

each of at least a subset of said instructions in said instruction set includes a repeat end field, said subset including those of said instructions frequently in loops and said NOP instruction;

said loop instruction modifying step comprises setting said repeat end field to a first end field value, said first end field value indicating that said modified loop instruction is said repeat end instruction; and said detecting step involves detecting said first end field value.

3. The method of claim 1, wherein said information processing chip includes a repeat count (RC) register that stores a changeable repeat count from which can be determined the number of times said code fragment has been iterated, said method further comprising the steps of:

initially setting said RC register to N, N being the number of times said code fragment is to be iterated; and decrementing said repeat count each time said repeat instruction is decoded.

4. The method of claim 1, wherein said information processing chip includes a PC incrementor that increments contents of said PC register and a repeat count (RC) register that stores a changeable repeat count from which can be determined the number of times said code fragment has been executed, said method further comprising the steps of:

initially setting said RC register to -N; and incrementing said RC register with said incrementor each time said repeat instruction is decoded;

wherein said terminating step comprises terminating said executing of said loop when said repeat count in said RC register indicates that said loop has been executed N times.

5. The method of claim 1, wherein said information processing chip includes a PC incrementor that increments said PC register and a repeat count (RC) register that stores a changeable repeat count from which can be determined the number of times a code fragment of N instructions has been executed, said method further comprising the steps of:

initially setting said RC register to -N; and incrementing said RC register with said incrementor each time said repeat instruction is decoded.

6. A method of implementing a zero overhead loop in an information processing chip having an instruction set with a plurality of instructions and repeat start (RS) and program counter (PC) registers; wherein said instructions include a repeat end field, said loop involves iterating N times a code fragment of at least two loop instructions, said repeat end field of a predetermined one of said loop instructions being set to a first end field value to indicate that said predetermined loop instruction is a repeat end instruction; said RS register stores an address of a first of said loop instructions; and said PC register stores an address of said loop instruction to be fetched next, said method comprising:

fetching, decoding and executing each of said instructions in a predetermined order by updating said address stored in said PC register;

when decoding said predetermined loop instruction, detecting that said predetermined loop instruction is said repeat end instruction by detecting said first end field value;

determining whether said loop has been iterated N−1 times;

as long as said loop has not been iterated N−1 times, upon detecting that said predetermined loop instruction is said repeat end instruction, loading said PC register with contents of said RS register so that, as said predetermined loop instruction is being executed, said first loop instruction is being fetched; so that said first loop instruction is executed after a last of said loop instructions is executed but not later than any other of said loop instructions is executed, said last loop instruction occurring later in said code fragment than said predetermined instruction; and terminating said loop when said code fragment has been iterated N times.

7. A method of executing a single instruction loop in an information processing chip having an instruction set with a plurality of instructions, and repeat start (RS) and program counter (PC) registers, wherein said instructions include a repeat end field; said loop involves executing a single instruction N-times, said single instruction and a nop instruction being combined into a single executable code fragment and said repeat end field of both said single and said nop instructions being set to a first end field value to indicate that said single and said nop instructions are repeat end instructions; said RS register stores an address of said single instruction; and said PC register stores an address of said instruction to be fetched next, said method comprising:

fetching, decoding and executing said instructions in said executable code fragment in a predetermined order by updating said address stored in said PC register, said single instruction being fetched before said nop instruction;

when decoding said single instruction and said nop instruction, detecting that said repeat end field is set to said first end field value;

determining whether said first end field value was detected N−1 times;

as long as said first end field value has not been iterated N−1 times, upon detecting said first end field value, loading said PC register with contents of said RS register so that, so that, after said single instruction and said nop instruction have each been executed once, said single instruction is executed an additional N−1 times without any intervening delays or nops; and terminating said loop when said single instruction has been executed N times.

8. A method of implementing a zero overhead loop in an information processing chip having an instruction set with a plurality of instructions; fetch, decode and execute cycles; and repeat start (RS) and program counter (PC) registers; wherein said loop involves iterating N times a code fragment of at least two instructions, said RS register stores an address of a first of said loop instructions; and said PC register stores an address of said loop instruction to be fetched next, said method comprising:

defining a repeat end field within said instruction set;

setting said repeat end field of a predetermined loop instruction to a repeat value;

setting said repeat end field of the remainder of said instructions in said code fragment to a no-repeat value, said remainder including a last instruction;

initially loading said PC register with contents of said RS register, said PC register maintaining the address of said instruction to be fetched next, so that said first instruction is fetched first;

thereafter incrementing said PC register so that said instructions are fetched, then decoded, then executed in order;

when decoding said predetermined instruction and detecting that said repeat end field is set to said repeat value, as long as said code fragment has not already been iterated N−1 times, instead of incrementing said PC register, loading said PC register with contents of said RS register so that said first instruction will be executed without delay after said last instruction has finished executing; and terminating said loop when said code fragment has been iterated N times.

9. The method of claim 8, wherein said information processing chip includes a repeat count (RC) register that stores a repeat count from which can be determined the number of times a code fragment of N instructions has been executed, said method further comprising the steps of:

initially setting contents of said RC register to N; and decrementing said contents of said RC register each time N instructions have been executed.

10. A method of implementing a loop in an information processing chip having an instruction set with a plurality of instructions; fetch, decode and execute cycles; and repeat start (RS) and program counter (PC) registers; wherein said loop involves executing N times a single instruction; said RS register stores an address of said one loop instructions; and said PC register stores an address of an instruction to be fetched next, said method comprising:

defining a repeat end field within each of said N-bit opcodes;

combining said single instruction and a nop instruction into a single executable code fragment;

setting said repeat end field of said single instruction and said nop instruction to a first end field value;

incrementing contents of said PC register, said PC register storing the address of said instruction to be fetched next, so that said instructions are fetched then decoded then executed in order;

when decoding said instructions and detecting that said repeat end field is set to said first end value, as long as said single instruction has not already been executed N−2 times, instead of incrementing said PC register, loading said PC register with contents of said RS register so that said single instruction is the next instruction fetched; and terminating said loop when said single instruction has been executed N times.

11. A system for implementing zero overhead loops in an information processing chip having an instruction set with a plurality of instructions, each having a repeat field that is set to a value selected from the group consisting of a repeat value or a non-repeat value; program count (PC), repeat start (RS) and repeat count (RC) registers; a multiplexer (MUX); and fetch, decode and execute cycles;

wherein said loop involves iterating N times a code fragment of at least one loop instruction, said system comprising:

a decoder that, when decoding said instructions during said decode cycle, sets and outputs a repeat flag only when decoding a repeat instruction, said repeat instruction having said repeat field set to said repeat value; said repeat instruction being any of said plurality of instructions; and a control circuit coupled to the output of said decoder that sets a control to a first control value when said repeat flag is set and said repeat count maintained by said RC register does not equal a repeat count end value, said not equal condition indicating that said loop instructions must be repeated at least one more time, and otherwise sets said control signal to a second control value, said control circuit outputting said control signal to a MUX select input and said RC register load input; such that, when said control signal is set to said first control value, said MUX is caused to output an address of a first of said loop instructions to said PC register, resulting in said loop instructions being repeated from said first instruction, and said RC register is caused to load a modified repeat count, said modified repeat count being selected from a decremented or an incremented version of said repeat count; and when said control signal is set to said second control value, said MUX outputs the address of a next of said instructions to said PC register, resulting in said instructions being sequentially executed, said loop instructions being repeatedly executed with zero overhead from at least the second time said loop instructions are executed.

12. The system from claim 11, further comprising a decrementor connected in a loop with said RC register, said decrementor receiving said repeat count from said RC register input, decrementing said repeat count to produce said modified repeat count, then outputting said decremented repeat count to said RC register so that said RC register loads said modified repeat count when said control circuit sets said control signal to said first control value.

13. The system from claim 11, further comprising:

an incrementor having an input and an output, said incrementor's output being coupled to a first selectable input of said MUX and an input of said RC register, said MUX selecting said incrementor's output when said control signal is set to said second control value;

a second MUX with third and fourth selectable inputs, a second select input, and an output coupled to said incrementor, said third selectable input being coupled to said PC register, said fourth selectable input being coupled to said RC register and said select signal input being coupled to said control signal; such that, when said control signal is set to said first control value, said second MUX outputs said repeat count from said RC register to said incrementor, which increments said repeat count to produce said modified repeat count, said RC register loading said modified repeat count while said control signal is set to said first control value; and when said control signal is set to said second control value, said second MUX outputs said address from said PC register to said incrementor to be incremented.

14. A computer system for implementing zero overhead loops in an information processing chip having an instruction set with a plurality of instructions and fetch, decode and execute cycles; wherein said loop involves iterating N times a code fragment of at least one loop instruction, N being an integer greater then 0, and said instructions include a repeat field that is settable to a value selected from the group consisting of a repeat value or a non-repeat value, said computer system comprising:

a program count (PC) register for storing and outputting a program count, said program count being the address of said instruction to be fetched next;

a repeat start (RS) register for storing and outputting a start address, said start address being the address of a first of said instructions;

an incrementor for incrementing said program count from said PC register, said incrementor outputting a next address;

a multiplexer (MUX) coupled to said incrementor and said RS register for outputting a selected value selected from said next address and said start address, said MUX selecting said start address when a control signal has a first control value and said next address when said control signal has a second control value, said MUX loading said PC register with said selected value;

a repeat count (RC) register for storing and outputting a repeat count;

a comparator for comparing said repeat count to a repeat count end value, said comparator outputting a not equal signal when said repeat count and said repeat count end value are different;

a decrementor for decrementing said repeat count after every execution cycle and outputting said decremented repeat count to said RC register;

a decoder that activates a repeat signal when decoding said instruction having said repeat field set to said first repeat value; and a gate for outputting said control signal, said gate setting said control signal to said first control value when said repeat signal and said not equal signal are active, said gate otherwise setting said control signal to said second control value.

15. A method for converting a source code repeat loop into a code fragment that can be efficiently run on a computer having a repeat start (RS) register and a repeat count (RC) register, said source code repeat loop having an initial repeat statement and at least two loop statements, said repeat statement indicating that said loop statements should be executed N times, said loop statements including a first statement and a repeat end statement determined by its position within said loop statements, said code fragment having first and repeat end instructions, said RC register holding a repeat count indicating the number of times said code fragment needs to be executed, said RS register storing the runtime address of said first instruction, said method comprising:

converting said initial repeat statement to an executable repeat instruction that, when executed, causes said computer to set said repeat counter (RC) to N and load said repeat start (RS) register with said runtime address of said first instruction;

converting said loop statements to corresponding loop instructions from said computer's instruction set, said loop instructions making up said code fragment; e.g., said first loop instruction corresponding to said first loop statement, each member of said instruction set including a repeat end field;

when converting said repeat end statement, setting said repeat end field of said resulting repeat end instruction to a first end field value, said first end field value triggering said computer executing said repeat end instruction to repeat said code fragment from said first loop instruction; and when converting statements other than said repeat end statement, setting said repeat end field of said resulting loop instructions to an end field value different from said first end field value.

16. A method for converting a source code repeat loop into a code fragment that can be efficiently run on a computer having a repeat start (RS) register and a repeat count (RC) register, said source code repeat loop having an initial repeat statement and one or more loop statements, said repeat statement indicating the number of times (N) said loop statements should be executed and a loop class selected from single instruction loop or multiple instruction loop; such that, when said loop class is said single instruction loop, said repeat code loop includes only a single loop statement followed by a NOP statement and, when said loop class is said multiple instruction loop, said repeat code loop includes only a plurality of loop statements; said RC register holding a repeat count indicating number of remaining loop iterations and said RS register storing a loop starting address, said method comprising:

converting said initial repeat statement to an executable repeat instruction that, when executed, causes said computer to set said repeat counter (RC) to said number N and load said repeat start (RS) register with runtime address of a first loop instruction in said code fragment;

when said class is said multiple instruction loop, converting said loop statements to corresponding loop instructions from said computer's instruction set, said loop instructions making up said code fragment; e.g., a first loop instruction corresponding to said first loop statement, said loop statements including a single repeat end statement at a predetermined position in the source code repeat loop that is converted to a repeat loop instruction;

when said class is said single instruction loop, converting said single loop statement and said NOP statement to corresponding single loop and NOP instructions from said instruction set, both said single loop and NOP statements being repeat end statements that are converted to repeat loop instructions, said first loop instruction corresponding to said single loop instruction;

when converting said repeat end statement, setting a repeat end field of said resulting repeat loop instruction to a first end field value, said first end field value triggering said computer executing said instruction to repeat said code fragment from said first loop instruction; said predetermined position being determined so that, depending on said computer's architecture, said first loop instruction is executed immediately after a last loop instruction is executed; and when converting statements other than said repeat end statement, setting said repeat end field of said resulting loop instructions to an end field value different from said first end field value.

\* \* \* \* \*

UNITED STATES PATENT AND TRADEMARK OFFICE
CERTIFICATE OF CORRECTION

PATENT NO. : 5,727,194
DATED : March 10, 1998
INVENTOR(S) : Avadhani Shridhar, et al.

It is certified that error appears in the above-indentified patent and that said Letters Patent is hereby corrected as shown below:

In Column 17, line 18:

In Claim 11, replace "that sets a control to" with --that sets a control signal to--.

Signed and Sealed this

Second Day of June, 1998

Attest:

BRUCE LEHMAN

*Attesting Officer*                *Commissioner of Patents and Trademarks*